(12) United States Patent
Knight et al.

(10) Patent No.: US 11,891,769 B2
(45) Date of Patent: Feb. 6, 2024

(54) SYSTEMS AND METHODS FOR USING DISCARDED (DEGRADED) ASPHALT SHINGLES (DAS) FOR STABILIZING SOILS IN BUILDING AND SURFACE CONSTRUCTIONS

(71) Applicants: Kurtney Knight, Poteet, TX (US); James Epp, San Antonio, TX (US)

(72) Inventors: Kurtney Knight, Poteet, TX (US); James Epp, San Antonio, TX (US)

(73) Assignee: Shingle Waste Solutions, Inc., San Antonio, TX (US)

( * ) Notice: Subject to any disclaimer, the term of this patent is extended or adjusted under 35 U.S.C. 154(b) by 15 days.

(21) Appl. No.: 17/858,940

(22) Filed: Jul. 6, 2022

(65) Prior Publication Data

US 2023/0008668 A1 Jan. 12, 2023

Related U.S. Application Data

(60) Provisional application No. 63/218,520, filed on Jul. 6, 2021.

(51) Int. Cl.
*E02D 27/32* (2006.01)
*E02D 27/01* (2006.01)

(52) U.S. Cl.
CPC ............ *E02D 27/32* (2013.01); *E02D 27/01* (2013.01); *E02D 2300/002* (2013.01); *E02D 2300/0098* (2013.01)

(58) Field of Classification Search
CPC ... E02D 27/32; E02D 27/01; E02D 2300/002; E02D 2300/0098
See application file for complete search history.

(56) References Cited

U.S. PATENT DOCUMENTS

| 2005/0035484 A1* | 2/2005 | Meyers, III | ............. E02D 29/14 |
| | | | 524/68 |
| 2016/0177529 A1* | 6/2016 | Devine | ................... E02D 27/38 |
| | | | 264/250 |

FOREIGN PATENT DOCUMENTS

DE 202018101426 U1 * 5/2018

* cited by examiner

*Primary Examiner* — Kyle Armstrong
(74) *Attorney, Agent, or Firm* — Kammer Browning PLLC

(57) ABSTRACT

Systems and methods are provided for re-purposing discarded asphalt shingles as soil stabilizers in building and land surface constructions. Discarded (and typically "degraded") Asphalt Shingles (DAS) are placed beneath building foundation slabs and parking lots in overlapping patterns to replace a measured amount of removed expansive soil to serve as a moisture barrier. DAS can be utilized beneath parking lots in areas of expansive soils by layering the shingles in overlapping patterns to create a moisture barrier from water intrusion from above or below. Building block system (BBS) units may be produced to facilitate handling and transport of the DAS materials to the construction site.

3 Claims, 6 Drawing Sheets (A - A')

SYSTEMS AND METHODS FOR USING DISCARDED (DEGRADED) ASPHALT SHINGLES (DAS) FOR STABILIZING SOILS IN BUILDING AND SURFACE CONSTRUCTIONS

CROSS REFERENCES TO RELATED APPLICATIONS

This application claims the benefit under Title 35 United States Code § 119(e) of U.S. Provisional Patent Application Ser. No. 63/218,520; Filed: Jul. 6, 2021; the full disclosure of which is incorporated herein by reference.

BACKGROUND OF THE INVENTION

1. Field of the Invention

The present invention relates generally to surface and sub-surface construction methods. The present invention also relates to the recycling and re-use of construction materials. The present invention relates more specifically to systems and methods for re-purposing discarded asphalt shingles as soil stabilizers in building and land surface constructions.

2. Description of the Related Art

The present invention addresses two specific problems: first, the common need to stabilize what would otherwise be expansive clay soils in and under construction sites; and second, the interest in keeping discarded asphalt roofing shingles out of landfills.

The present invention seeks to provide a solution to the problem caused by the routine disposal of asphalt shingles in landfills. Eleven million tons of asphalt waste is generated each year most of which ends up in landfills. The disposed asphalt shingles have structural integrity and composition which takes up to 300 years or more to decompose. There is a need for utilization of disposed asphalt shingles with significant remaining beneficial usefulness rather than burying in landfills.

The present invention also seeks to provide an alternative solution to problems associated with building on expansive clay soils that exist in many parts of the country. In significant areas of Texas (for example) there exists strata of expansive soils (also known as swelling clay) near the surface. When located beneath an area designated for construction or for parking, the expansive soil creates an instability for concrete slabs and parking lots. When subsurface expansive soils are exposed to moisture they expand and create a vertical rise that can cause damage to concrete and parking pavement if not addressed. Currently, expansive soils are treated with chemical stabilizers, or the swelling clay is removed and replaced with select fill material which has minimal expansion when exposed to moisture. The cost of select fill is significantly more expensive than discarded shingles. The shingles are impervious to moisture and compact to form a stable sub-base material.

Moisture that penetrates concrete slabs and parking lots can migrate from below the surface causing damage. Layers of compressed asphalt shingles create a moisture barrier that limits the amount of water that impacts surface structures.

SUMMARY OF THE INVENTION

The present invention provides systems and methods for re-purposing discarded asphalt shingles as soil stabilizers in building and land surface constructions. Degraded Asphalt Shingles (hereinbelow also referred to as "DAS") are placed beneath building foundation slabs and parking lots in overlapping patterns to replace a measured amount of removed expansive soil to serve as a moisture barrier. The DAS is layered beneath and between Select Fill (hereinbelow also referred to as "SF") and existing sub-surface face soils. The depth and width of the layers of SF and DAS will depend on the Potential Vertical Rise (hereinbelow also referred to as "PVR") of the expansive soils and the depth of formations. DAS can be utilized beneath parking lots in areas of expansive soils by layering the shingles in overlapping patterns to create a moisture barrier from water intrusion from above or below.

Forming the DAS material into discrete building blocks facilitates the handling and transport of the material. Various methods may be used to bind stacked and cross-oriented layers of the DAS material into various sized blocks that may be positioned within excavations and used as forms for concrete slabs and the like.

DETAILED DESCRIPTION OF THE PREFERRED EMBODIMENTS

Figure 1:
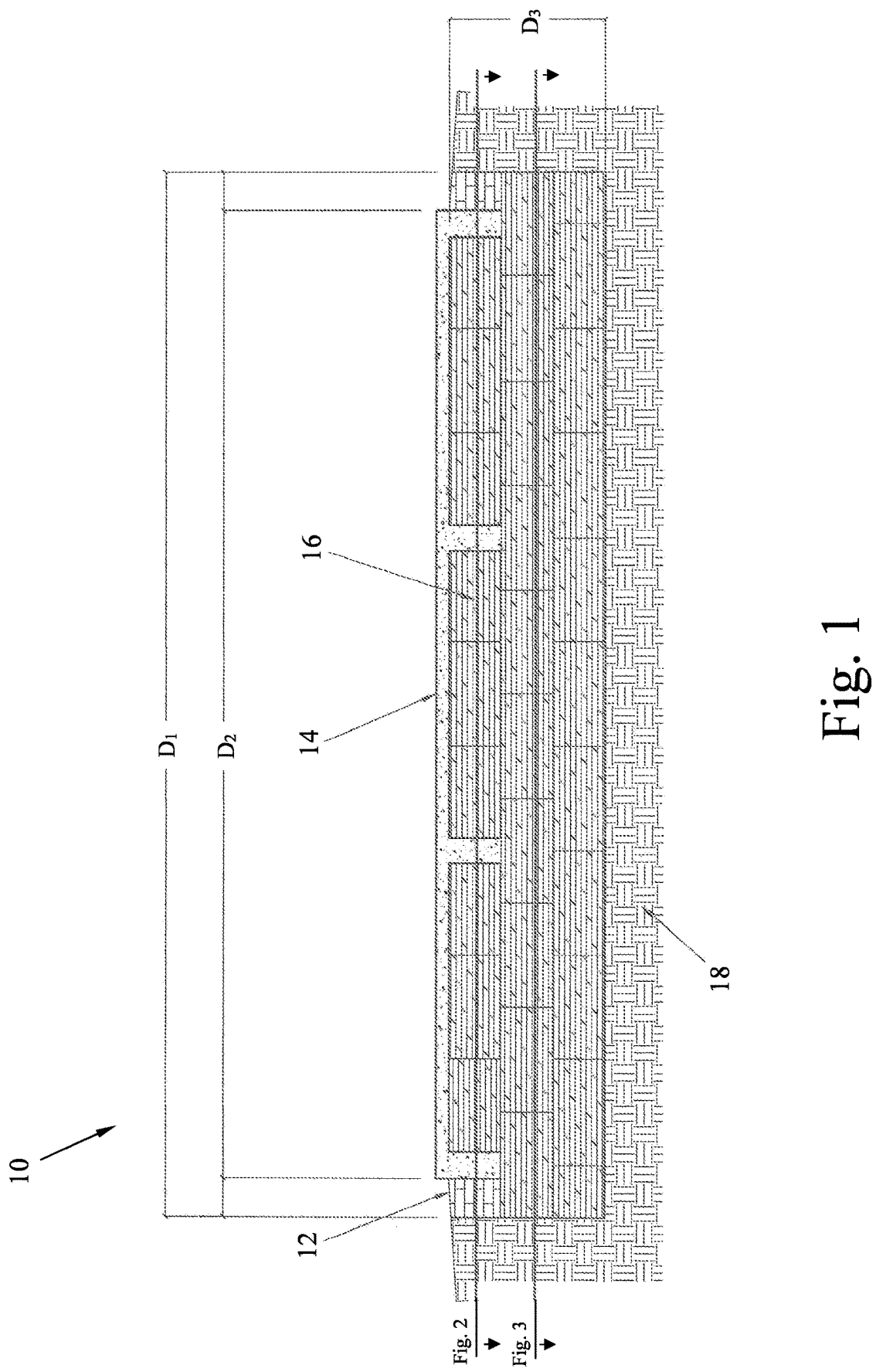
FIG. 1 is a cutaway profile view of an implementation of a first preferred embodiment of the systems and methods of the present invention in connection with the stabilization of soils beneath a slab building foundation.

Reference is made first to FIG. 1 which is a cutaway profile view of an implementation of a first preferred embodiment of the systems and methods of the present invention in connection with the stabilization of soils beneath a slab building foundation. In this implementation, pre-formed building block units are used beneath a reinforced concrete construction pad. As shown in FIG. 1, stabilizing system 10 is generally constructed within an excavation made into in situ soil 18 having typical length dimension $D_1$, width dimension $D_4$ (see FIG. 2), and depth dimension $D_3$. A typical example as shown might be constructed with $D_1$=40 feet; $D_4$=24 feet; and $D_3$=6 feet.

Stabilizing system 10 is constructed with an array of building block system (BBS) units 16 positioned and stacked in staggered layers within the excavation in the manner shown, with reinforced concrete slab and beams 14 formed over the BBS units 16. In the preferred embodiment, the concrete slab foundation should be incrementally smaller than the BBS unit filled excavation having a foundation length dimension $D_2$ (37 feet typical within a 40 foot long excavation); a foundation width dimension $D_5$ (20 feet typical within a 24 foot wide excavation); and a foundation depth dimension of 2-3 feet (typical). It is preferable to have clay backfill 12 around the perimeter of the slab on top of the lower layers of BBS units 16.

The BBS units 16 shown in FIG. 1 are nominally 4 foot×4 foot×2 foot (see FIGS. 4 & 5 for details) but could be constructed of any dimensions that might be easily handled (with fork lifts, for example) and shipped (on flat bed trucks, for example). BBS units sized as 4 foot×2 foot×2 foot might be used in conjunction with the 4 foot×4 foot×2 foot units to fill out the dimensions of a specific installation. Other unit sizes and other combinations of variously sized BBS units are anticipated.

Figure 2:
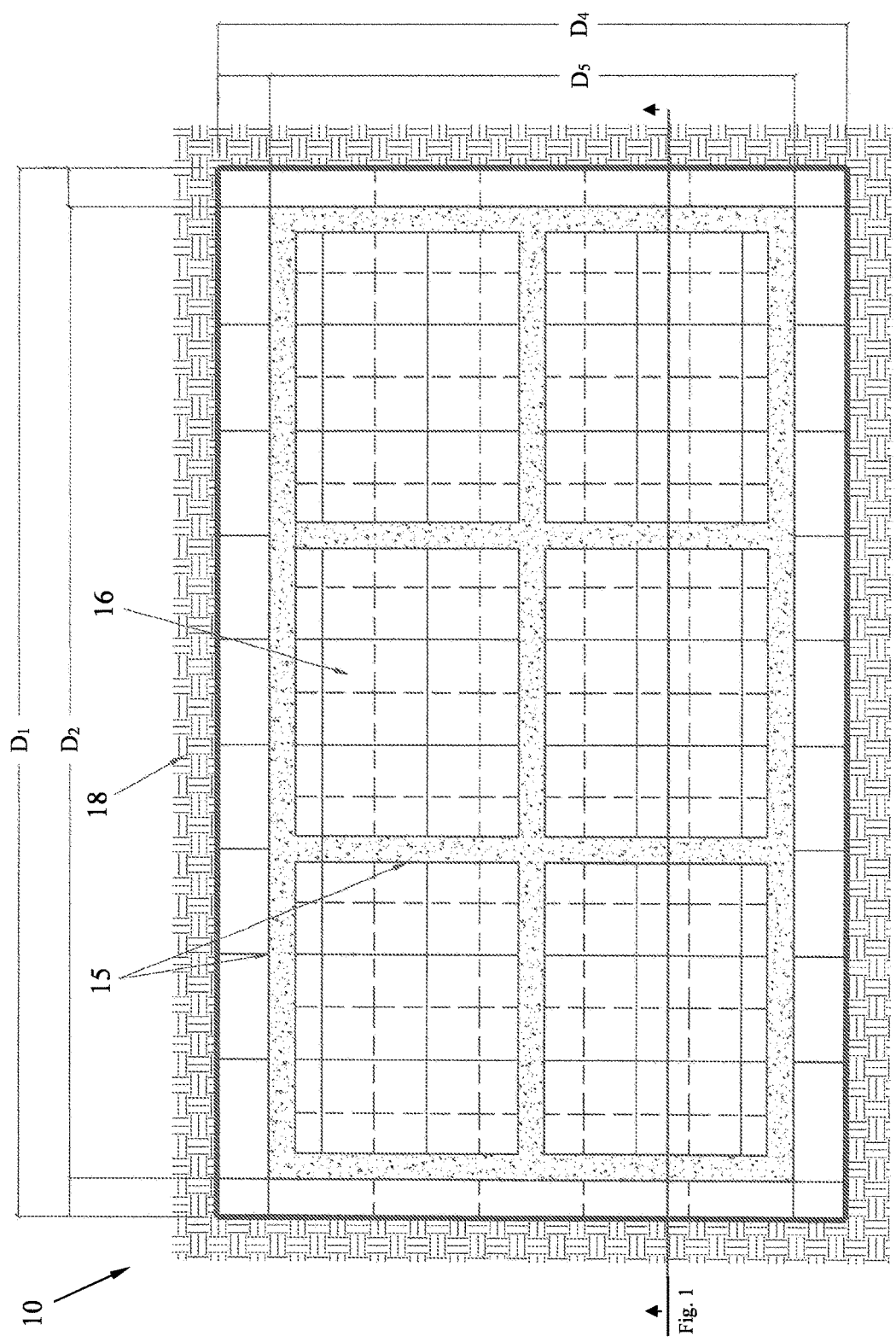
FIG. 2 is a cutaway plan view of the implementation of the systems and methods of the present invention shown in FIG. 1 taken along the Section Line referenced in FIG. 1 as "FIG. 2".

FIG. 2 is a cutaway plan view of the implementation of the systems and methods of the present invention shown in FIG. 1 taken along the Section Line referenced in FIG. 1 as "FIG. 2". In this view, stabilizing system 10 is again shown to be generally constructed within an excavation made into in-situ soil 18 having typical length dimension $D_1$, width dimension Da, and depth dimension $D_3$ (see FIG. 1). Once again, a typical example as shown might be constructed with $D_1$=40 feet; $D_4$=24 feet; and $D_3$=6 feet.

Stabilizing system 10 is again shown to be constructed with an array of building block system (BBS) units 16 positioned and stacked in staggered layers within the excavation in the manner shown. Solid lines for the BBS units 16 represent a first, visible layer, while broken lines for the BBS units 16 represent a staggered lower layer. The staggered layers, of course, improve overall stability and reduce or eliminate vertical shifting. In FIG. 2, reinforced concrete beams 15 are formed over and around the BBS units 16.

In the preferred embodiment, the concrete slab foundation should be incrementally smaller than the BBS unit filled excavation having a foundation length dimension $D_2$ (37 feet typical within a 40 foot long excavation) and a foundation width dimension $D_5$ (20 feet typical within a 24 foot wide excavation).

Figure 3:
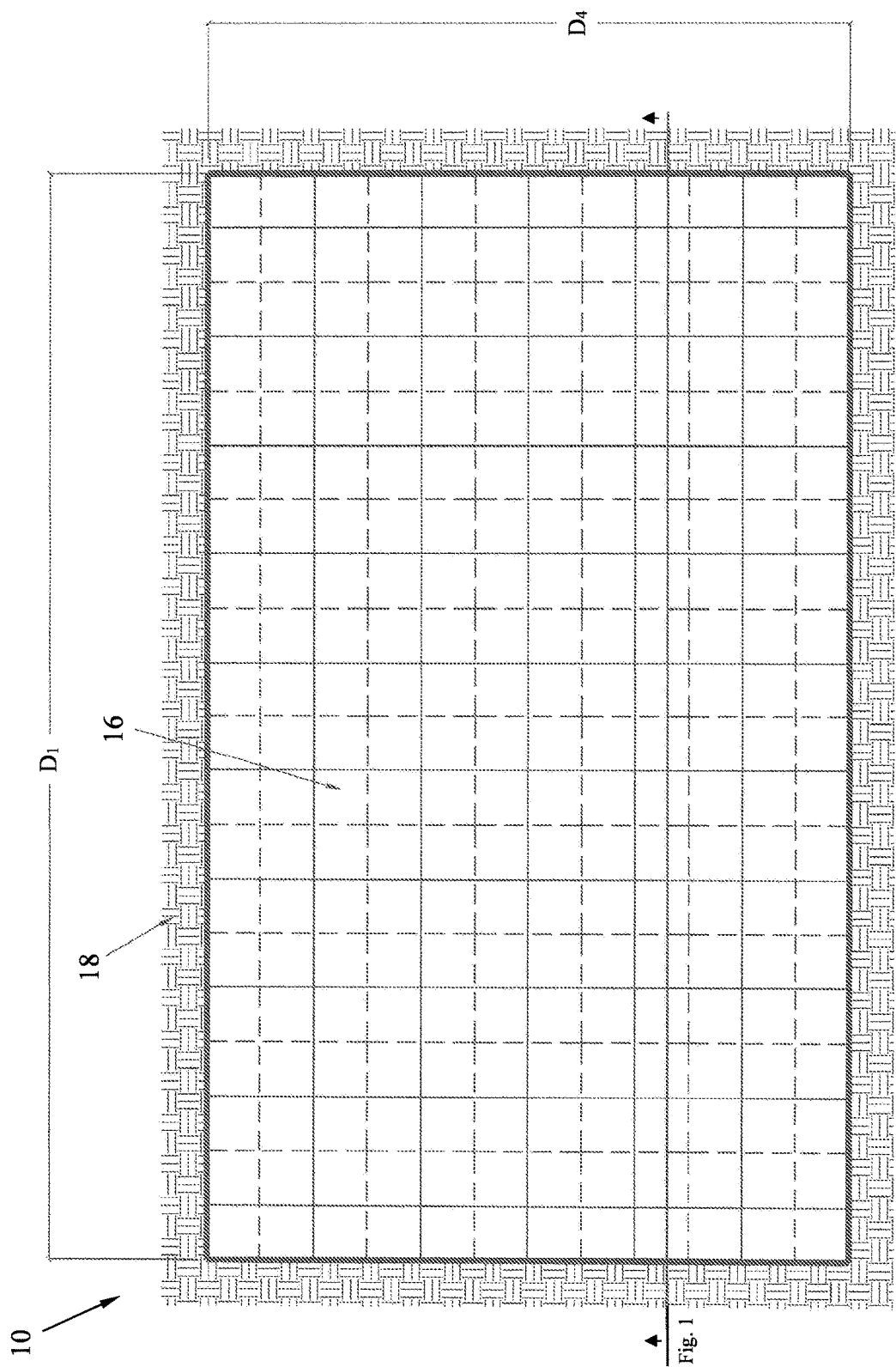
FIG. 3 is a cutaway plan view of the implementation of the systems and methods of the present invention shown in FIG. 1 taken along the Section Line referenced in FIG. 1 as "FIG. 3".

FIG. 3 is a cutaway plan view of the implementation of the systems and methods of the present invention shown in FIG. 1 taken along the Section Line referenced in FIG. 1 as "FIG. 3". In this view, a plan view below the concrete slab, only the stacked and staggered BBS units 16 are seen in the in-situ soil 18 excavation. Once again, solid lines for the BBS units 16 represent a first, visible layer, while broken lines for the BBS units 16 represent a staggered lower layer.

In a preferred method of constructing the system 10 shown in FIGS. 1-3, an excavation of the required dimensions (refined to be equal to a multiple of the available sized BBS units) is made. The excavation is then filled with the lower staggered layers of BBS units that will sit below the entire concrete foundation. BBS units are then arranged in groups on top of the lower layers in a manner that defines the concrete beams to be formed. The BBS units are sufficiently heavy as to remain in place as the reinforced concrete slab and beams are poured and formed. The perimeter edge may be confined using standard foundation wall forms that are removed after curing and then back filled with clay as shown in FIG. 1.

Figure 4:
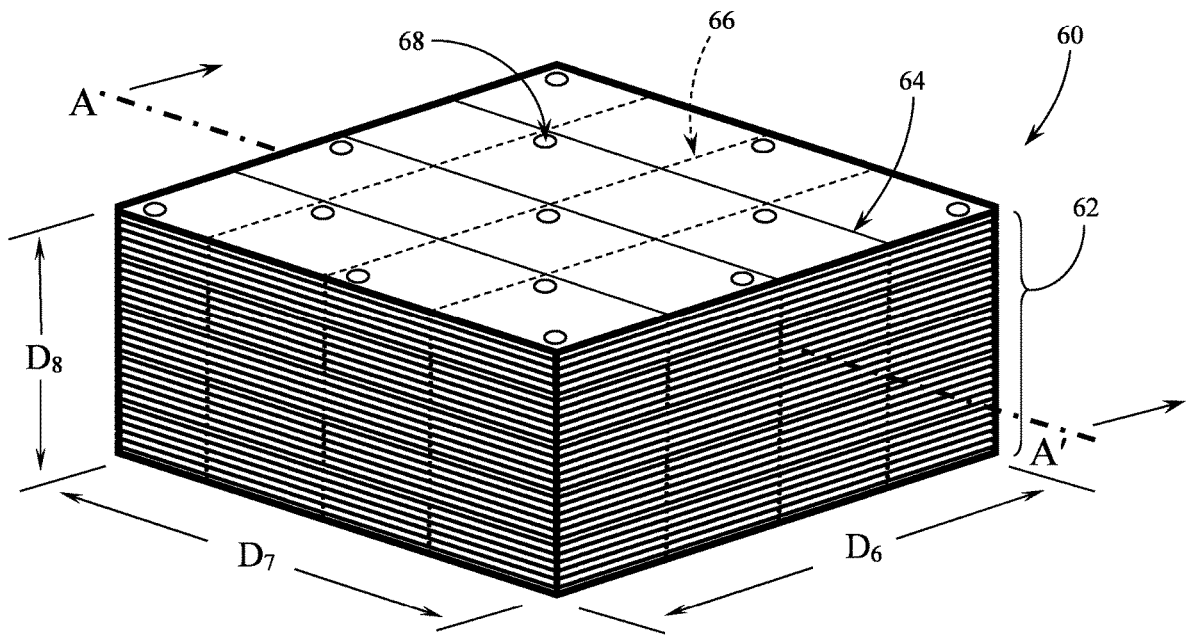
FIG. 4 is a perspective view of a representative example of a single constructed building block of the systems and methods of the present invention shown used in FIG. 1.
Figure 5:
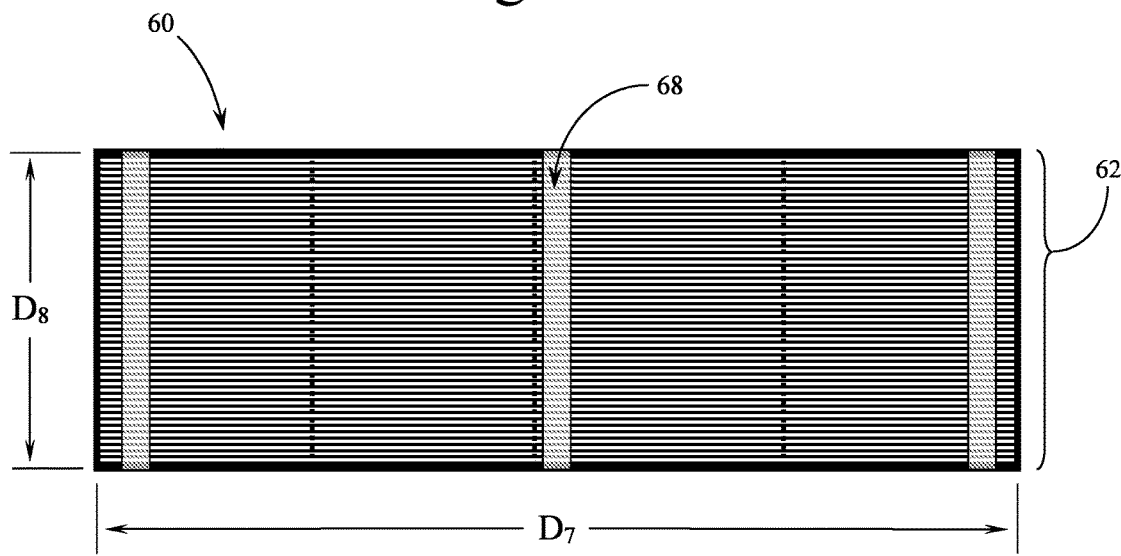
FIG. 5 is a cross-section view of the representative example of a single constructed building block of the system of the present invention shown in FIG. 4, viewed along Section Line A-A'.

Reference is now made to FIGS. 4 & 5 for a description of the structures and methods of manufacturing an individual BBS unit of the type utilized in the first embodiment shown in FIGS. 1-3 above. FIG. 4 is a perspective view of a representative example of a single constructed building block of the systems and methods of the present invention shown used in FIG. 1. Building block system (BBS) unit 60 is generally made up of asphaltic shingle layers 62, which may include whole, partially degraded, or even smaller pieces of typical used and discarded roofing shingles. Preferably the whole or nearly whole shingles are stacked parallel to each other in a single layer and oriented orthogonally to the layers beneath and above the specific layer. In this manner, the assembled block can be bound together in a very strong layered bundle. In FIG. 4, a top layer 64 of shingles (solid lines) is oriented in a first direction while a second layer 66 of shingles (broken lines) is oriented orthogonal to the first layer.

Various methods of binding the layers may be employed in the production of the BBS units. In FIG. 4, a "hot stab" method is shown wherein a heated rod is driven through the layers of shingles at various points, being directed from one face of the block to the opposite face. In the process of moving through the layers the heated rod melts the adjacent portions of the shingles through which it passes, melting the walls of the produced shaft 68 and thereby binding the layers together. Other methods for binding the BBS unit together include: (a) using mechanical attachment devices (bolts, screws, rivets, etc.) that are passed through the layers and bound on either end; (b) screws that penetrate one layer and two or three adjacent layers, building a bound block as the shingles are layered on; (c) high pressure that forces the pliable asphaltic material together (with or without heat); (d) high temperature that melts the layers together (with or without pressure); (e) adhesives placed between the layers (with or without pressure); (f) wrapping of the entire bundle with polymer plastic sheeting; (g) strapping the bundle with plastic or metal straps, cords, or wires; (h) heated rods (described above with FIGS. 4 & 5); (i) drilling shafts to mechanically disrupt each layer in a manner that holds one layer to the next (with or without heat); or (j) ant combination of the above methods.

The dimensions of a single BBS unit can vary significantly but the preferred dimensions start with the basic dimensions of the more common roof shingles. Although asphaltic roof shingles come in many shapes and sizes a traditional design comprises a 12 inch by 36 inch three tab design. Discarded shingles often break along a tab which results in discarded shingles most often being 12×36; 12×24; or 12×12 (inches in each case). Such pieces lend themselves to being assembled in layers that are 4 feet by 4 feet; 3 feet by 3 feet; 2 feet by 4 feet; 2 feet by 3 feet; etc. The larger the BBS unit the fewer discrete blocks that are required for a given construction. The factors that ultimately limit the preferable dimensions of a BBS unit are handling and transport limitations. The embodiment shown in FIGS. 4 & 5 provides a dimension balance between making the block as large as possible while still being readily handled by standard construction equipment such as forklifts and cranes. In FIGS. 4 & 5, BBS unit 60 may preferably have dimension $D_6$ equal to 4 feet; dimension $D_7$ equal to 4 feet; and dimension $D_8$ equal to 2 feet.

FIG. 5 is a cross-section view of the representative example of a single constructed building block of the system of the present invention shown in FIG. 4, viewed along Section Line A-A'. In this view, heated rod produced shafts 68 are positioned in a spaced array that solidly binds the shingle layers 62 together. Such binding is sufficient to allow for the rough handling of the produced block without the layers separating. As described above, other methods for adequately binding the layers together are anticipated.

Figure 7:
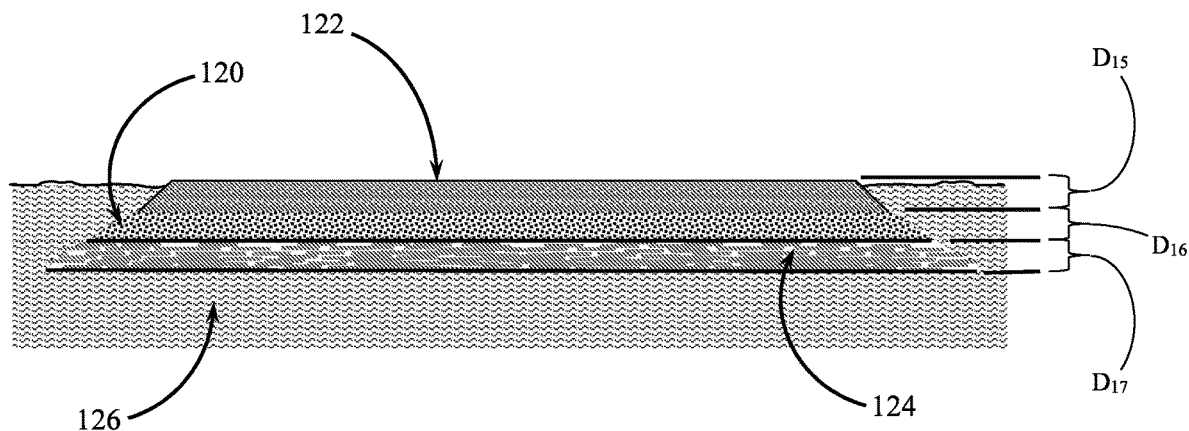
FIG. 7 is a cutaway view of an implementation of a third preferred embodiment of the systems and methods of the present invention in connection with the stabilization of soils beneath a surface construction (such as a paved parking lot).

FIG. 7 is a cutaway view of an implementation of a third preferred embodiment of the systems and methods of the present invention in connection with the stabilization of soils beneath a surface construction (such as a paved parking lot).

Figure 8:
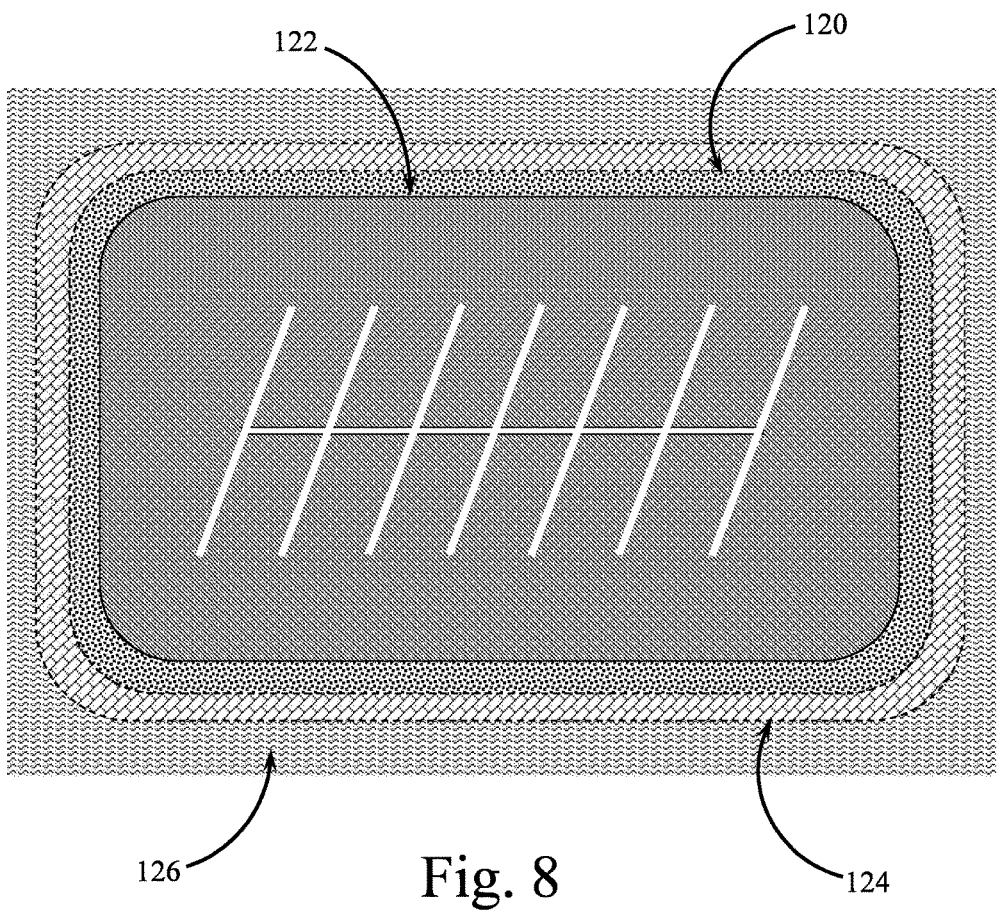
FIG. 8 is a top plan view of the implementation of the third preferred embodiment of the systems and methods of the present invention as shown in FIG. 7, in connection with the stabilization of soils beneath a surface construction (such as a paved parking lot), with perimeter fill removed for clarity.

FIG. 8 is a top plan view of the implementation of the third preferred embodiment of the systems and methods of the present invention as shown in FIG. 7, in connection with the stabilization of soils beneath a surface construction (such as a paved parking lot), with perimeter fill removed for clarity.

Figure 6:
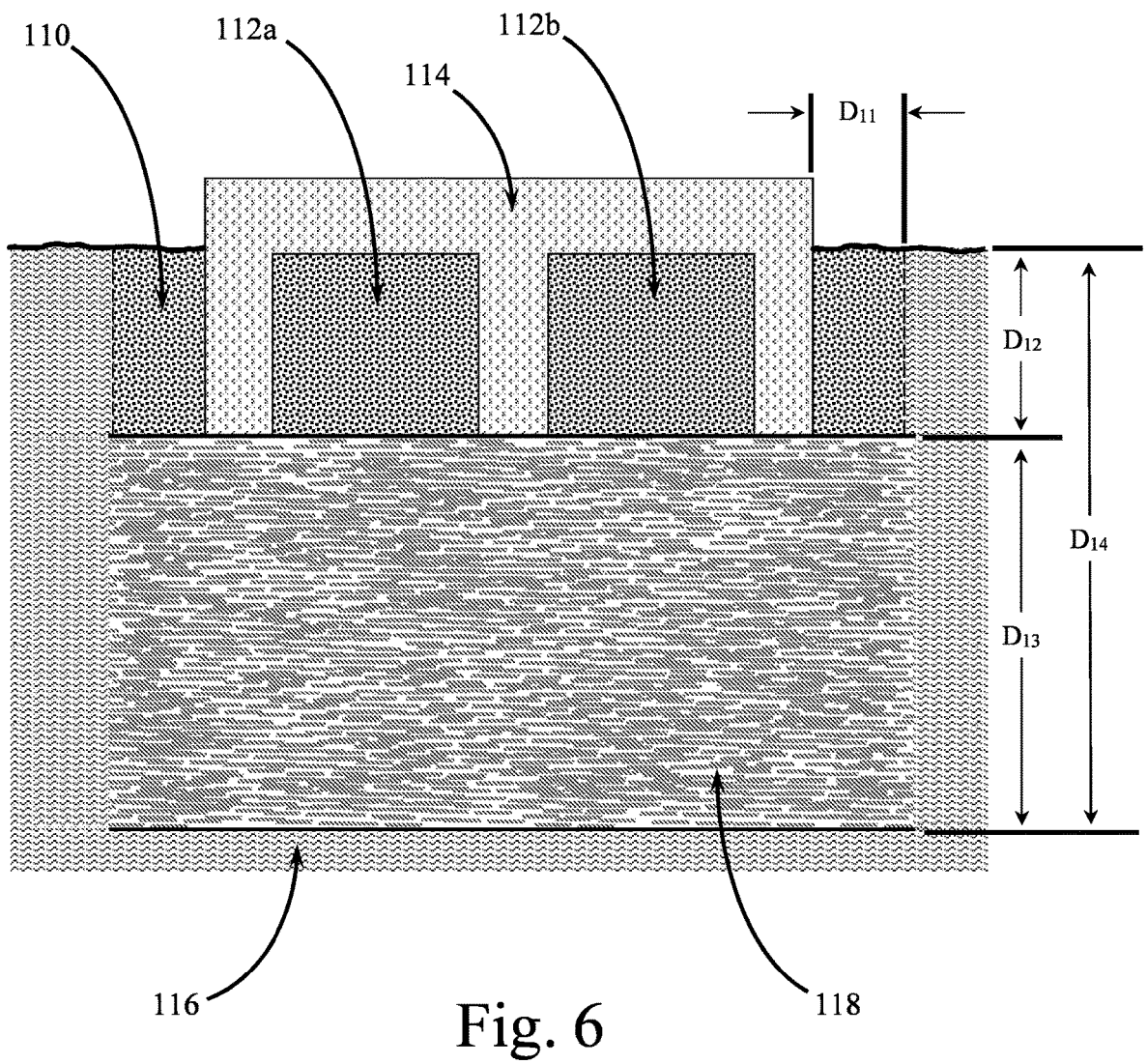
FIG. 6 is a cutaway view of an implementation of a second preferred embodiment of the systems and methods of the present invention in connection with the stabilization of soils beneath a slab building foundation.

Reference is made next to FIG. 6 which shows a profile cutaway view of an implementation of a second preferred embodiment of the systems and methods of the present invention in connection with the stabilization of soils beneath a slab building foundation. In the example shown, monolithic slab 114 is shown with select fill 110 around the slab and select fill 112a & 112b beneath the floor portion of the slab within the beam walls of the slab. This arrangement is typical in modern construction techniques and is similar to the arrangement described above with FIG. 1. Typical modern building techniques would also include expensive select fill below the entire foundation in place of removed expansive soils (swelling clay) to reduce upheaval with water intrusion. Alternately, the expansive soils might be treated with expensive soil stabilizers to reduce upheaval.

The alternate embodiment of the present invention shown in FIG. 6 instead provides layered discarded asphalt shingles in place of a quantity of excavated expansive soil as the initial step in the process of preparing the site for the foundation. A volume of the in-situ soil 116 is removed and replaced with layers of discarded (typically also degraded) asphalt shingles (DAS) 118 on top of the in-situ soil 116 remaining.

In the example shown, there is a typical distance $D_{11}$ of three feet around the perimeter of the slab 114 that is filled to grade level with select fill 110. The typical depth $D_{12}$ of the foundation slab 114 below grade may be two to six feet. In the present invention, a quantity of discarded asphalt shingles 118 is positioned beneath the foundation slab 114 and the perimeter select fill 110. The depth $D_{13}$ of the DAS 118 may, in a preferred embodiment, be anywhere from four to ten feet. This depth may be greater if the size (mass) of the building warrants it or less if the structure is smaller. Overall, an excavation depth of $D_{14}$ in the range of six to sixteen feet would be typical for implementation of the systems and methods of the present invention.

Reference is finally made to FIGS. 7 & 8 which show a typical implementation of the systems and methods of the present invention in connection with the stabilization of soils beneath a surface construction such as a paved parking lot. FIG. 7 shows a profile cutaway view and FIG. 8 shows a top plan view of a representative paved parking area.

In FIG. 7 in-situ soil 126 is shown excavated and replaced first with a layer of discarded asphalt shingles (DAS) 124, followed by a layer of select fill (SF) 120, and topped with a layer of asphalt paving 122. The typical thickness $D_{15}$ of asphalt paving layer 122 may preferably be in the four to six inches range. The typical thickness $D_{16}$ of select fill layer 120 may preferably be in the six to eight inches range. The typical thickness $D_{17}$ of discarded asphalt shingles layer 124 may preferably be in the six to ten inches range.

FIG. 8 is a top plan view of the parking surface construction shown in FIG. 7 with perimeter soil removed to show the wider lower layers. In the preferred embodiment, the select fill layer 120 extends beyond the perimeter of the asphalt paving layer 122 by one to two feet or more. Similarly, the discarded asphalt shingles layer 124 extends beyond the perimeter of the select fill layer 120 by one to two feet or more. In this manner, upheaval around the edges of the pavement is reduced or eliminated.

Although the present invention has been described in conjunction with a number of preferred embodiments, those skilled in the art will recognize modifications to these embodiments that still fall within the scope of the present invention. Concrete driveways, sidewalks, and other surface structures fall somewhere between a paved parking area and a building slab foundation and could also benefit from the systems and methods of the present invention. In general, the goal is to provide a "ground shadow" of a moisture barrier that replaces and/or separates the constructed surface or foundation from the expansive soils that would otherwise swell with moisture and buckle or crack the construction. Essentially, any formed construction that rest on or in expansive soils could benefit from the systems and methods of the present invention. Swimming pools, concrete culverts, buried concrete drains, concrete septic tanks, etc. could all benefit from the application of the present invention. The present invention finds application in association with precast or poured in place structures.

We claim:

1. A system for stabilizing otherwise expansive soils beneath a rigid structure constructed on or in the expansive soils, the system comprising:
    a quantity of discarded and/or degraded asphalt shingles, the asphalt shingles arranged in stacked parallel layers to form a moisture barrier, the layers placed over and within the in-situ expansive soils; and
    a quantity of select fill material positioned over the stacked parallel layers of asphalt shingles and below and around the rigid structure;
    wherein the rigid structure and the select fill are predominantly supported on the asphalt shingles and therefore are not in direct contact with expansive soils that might swell when infiltrated with moisture.

2. A method for stabilizing otherwise expansive in-situ soils beneath a rigid structure constructed on or in the expansive soils, the method comprising the steps of:
    excavating a quantity of in-situ expansive soil to establish a below grade space for layered construction;
    recovering a quantity of discarded and/or degraded asphalt shingles of the type typically removed as old roofing material;
    layering the quantity of discarded and/or degraded asphalt shingles within the below grade space excavated within the in-situ expansive soils;
    arranging the asphalt shingles in stacked parallel layers to form a moisture barrier above the floor of the below grade excavated space;
    positioning a quantity of select fill material over the stacked parallel layers of asphalt shingles; and
    positioning or constructing the rigid structure over and/or within the select fill;
    wherein the rigid structure and the select fill are generally supported on the asphalt shingles and therefore are not in direct contact with expansive soils that might swell when infiltrated with moisture.

3. A construction block unit of asphaltic material manufactured from discarded asphaltic roofing shingles, the construction block unit comprising:
- a plurality of layers of discarded and/or degraded asphalt shingles, the asphalt shingles arranged in stacked layers, each layer comprising shingles generally arranged with a long dimension of each shingle oriented in a first orientation, and with immediately adjacent layers of shingles generally arranged with the long dimension of each shingle oriented in a direction orthogonal to the first orientation; and
- a binding material interspersed between and through the layers of shingles to bind the layers into a unitary construction block.

* * * * *